Aug. 20, 1935.  C. H. VOGT  2,011,989
FILLING APPARATUS
Original Filed Feb. 21, 1928  2 Sheets-Sheet 1
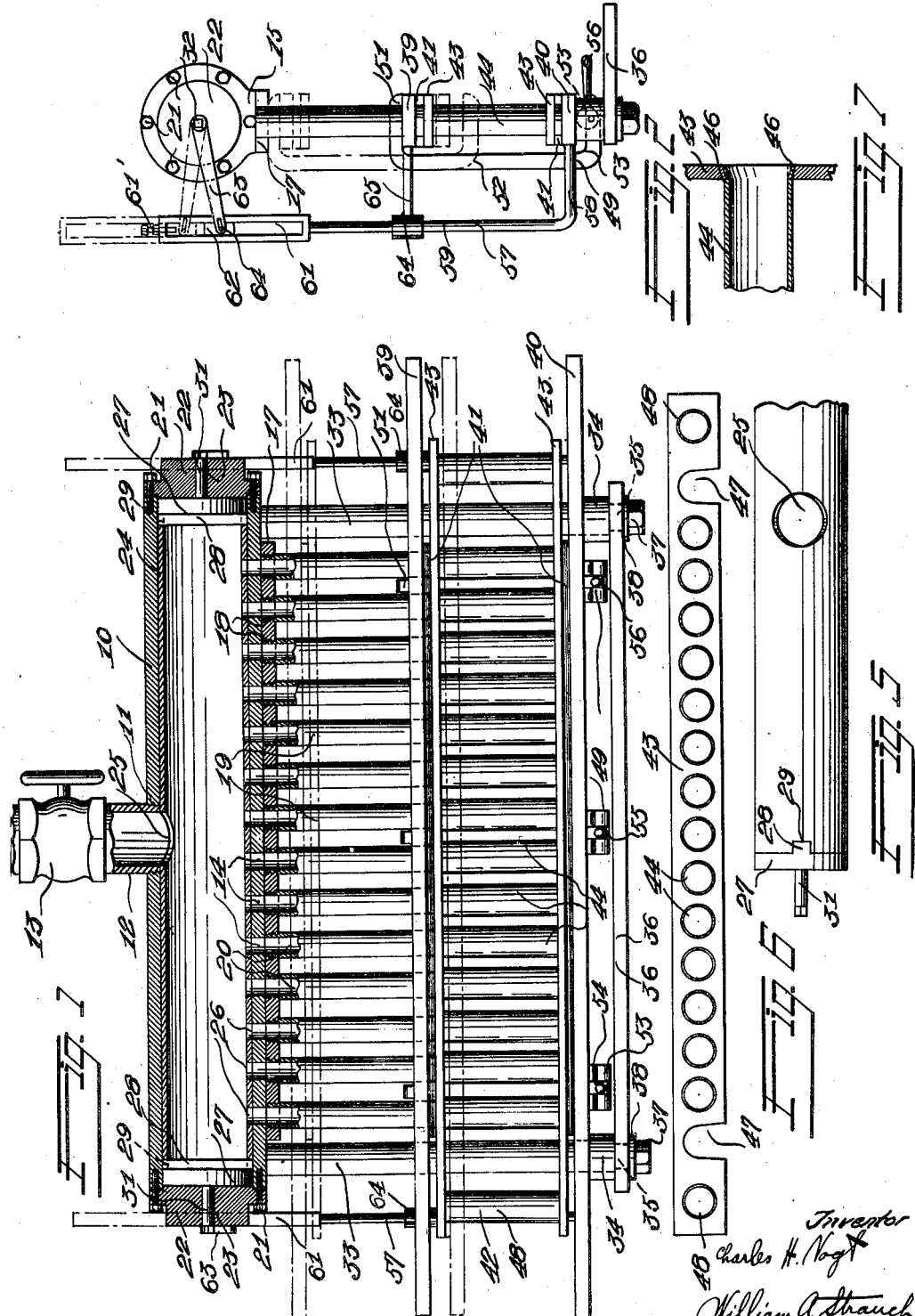

Aug. 20, 1935.  C. H. VOGT  2,011,989
FILLING APPARATUS
Original Filed Feb. 21, 1928   2 Sheets-Sheet 2
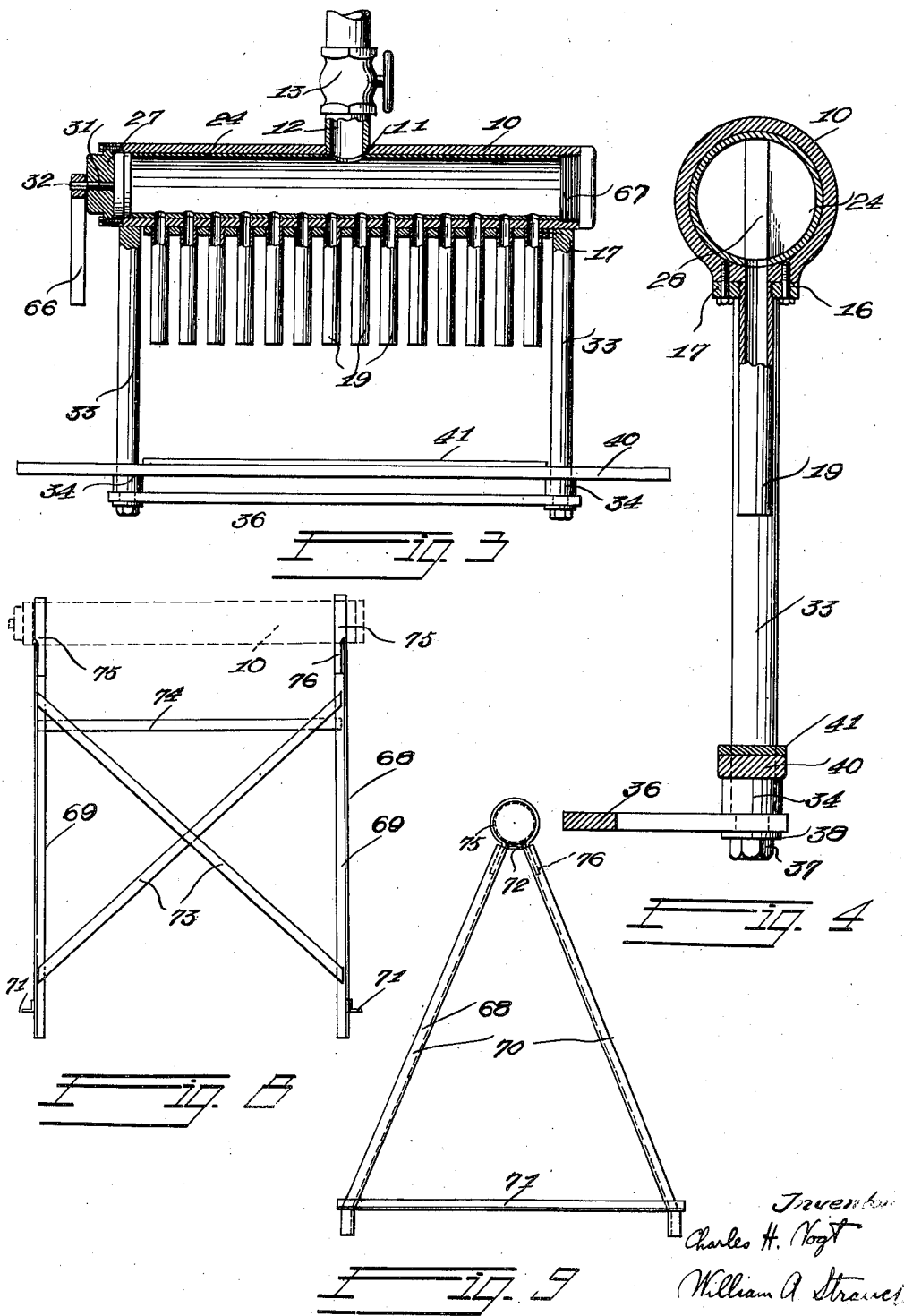

Patented Aug. 20, 1935

2,011,989

UNITED STATES PATENT OFFICE 2,011,989

FILLING APPARATUS

Charles H. Vogt, Philadelphia, Pa.

Application February 21, 1928, Serial No. 255,941
Renewed December 8, 1932

15 Claims. (Cl. 17—32)

This invention relates to apparatus for filling molds, and more particularly, my invention relates to apparatus including molds and a machine for filling sausage meat or other products into molds in which the filled substances are shaped to the form of the molds.

The principal object of the present invention is to provide apparatus for the formation of sausages of the casingless type which will be uniform in size and compactness, and which will permit the sausages to be produced in an economical manner.

Another object of my invention is to provide an apparatus for the production of casingless sausages comprising molds and mold filling means in which the feed of sausage meat from the filling means to the mold is automatically controlled.

A further object of the invention is to provide sausage forming apparatus which is readily accessible for cleaning purposes thus aiding the production of sausages in a highly sanitary condition.

Still another object of the invention is to provide sausage forming apparatus including a manifold provided with a removable valve structure adapted to regulate the flow of meat from the manifold.

Further objects of my invention will appear and the nature and characteristic features thereof will be more readily understood from the following description, taken in connection with the accompanying drawings forming part thereof, and in which Figure 1 is a top plan view of one form of my improved apparatus partially in horizontal section.

Figure 2 is an end elevation as viewed from the left of the form shown in Figure 1.

Figure 3 is a part plan and part horizontal sectional view of a modified form of apparatus.

Figure 4 is an enlarged sectional view through the structure disclosed in Figure 3.

Figure 5 is an enlarged fragmental view of the cylindrical valve disclosing particularly the means detachably associated therewith for actuating the valve.

Figure 6 is a side elevation view of the mold shown in plan in Figure 1.

Figure 7 is a fragmental sectional view showing a preferred means of connection between the ends of the mold tubes and the side bars thereof.

Figure 8 is a front elevation view of a support for the apparatus shown in Figure 1 or 3.

Figure 9 is an end elevational view of the support disclosed in Figure 8.

Referring to the drawings, and particularly Figures 1 and 2 thereof by reference characters in which like characters designate like parts, 10 designates a manifold in the form of an open ended cylinder, the cylinder being provided with a relatively large threaded aperture 11 for detachable connection with the externally threaded end of a sausage meat supply pipe 12, which pipe leads to the cylinder of a sausage stuffer (not shown) of the well known form. A suitable valve construction 13 is interposed in the pipe 12 for the purpose of controlling the supply of meat from the stuffer to the manifold.

The manifold 10 is further provided with a longitudinal series of relatively small apertures 14 in the wall thereof diametrically opposite the aperture 11. The side of manifold 10 adjacent the apertures 14 is thickened providing a flat face 15 as is more clearly shown in Fig. 2. Detachably secured to the flat face 15 of the manifold 10 by means of suitable securing means such as bolts 16 shown in Fig. 4 is an elongated flat bar 17 provided with a longitudinal series of internally threaded apertures 18 adapted to aline with the apertures 14 in the manifold 10. Detachably secured within each threaded aperture 18 is a threaded end of a nozzle 19 the inner bores 20 of which are of the same diameter as that of the apertures 14.

While I have disclosed the nozzles 19 as being detachably secured to the bar 17, they may be rigidly secured to the bar by any well known means. It will be seen in either instance that the bar 17 and nozzles 19 are removable as a unit from the manifold 10.

Detachably secured to the open ends of manifold 10 by means of suitable securing bolts 21 are caps 22 each of which is provided with a central bore 23 coincident with the longitudinal axis of the manifold 10. Removably disposed within the manifold 10 is a cylindrical valve member 24 with the open ends thereof in spaced relation to the inner ends of the caps 22. Cylindrical valve member 24 is provided with an aperture 25 of a diameter equal to the internal diameter of pipe 12 as is clearly shown in Fig. 1 and the valve member is further provided with a longitudinal series of apertures 26 diametrically opposite the aperture 25 and of a diameter approximately equal to that of the apertures 14 and bores 20 of the nozzles 19.

Disposed within each end of the manifold 10 between the inner end of cap 22 and the adjacent end of valve member 24 is a rotatable disk member 27 provided with a diametrically extending tongue 28 adapted to seat in diametrically opposed slots 29 in the end of the valve member. Each disk member 27 is provided with a spindle 31 provided with a squared end 32, the spindles extending through and being journalled in bores 23 in the caps 22 with the squared portions 32 extending beyond the caps. Suitably supported by and extending outwardly from the manifold 10 parallel to the nozzles 19 and disposed on either side of the series of nozzles adjacent the ends of the manifold is a pair of mold supporting and guide rods 33 provided at their free or outer ends with stop members 34 and having reduced threaded ends 35 adapted to extend through holes in the opposite ends of a handle member 36 which handle member is held in engagement with the stop members 34 by means of suitable nuts 37 and washers 38 engaged with the reduced threaded ends 35.

Slidably mounted on the rods 33 is a pair of parallel mold gripping bars 39 and 40 each provided with a rubber strip 41 on the side thereof opposite the other bar. The bars 39 and 40 are preferably provided with apertures 47 to receive the rods 33 and provide a slidable connection therewith, the bars extending an appreciable distance beyond the sides of the oppositely positioned rods 33 for a purpose presently to be described. Bar 39 and its rubber strip 41 are furthermore provided with holes that fit slidably over nozzles or filling tubes 19, and bar 40 is imperforate between guide rods 33.

The reference character 42 designates a mold structure which comprises a pair of spaced parallel side bars 43 and a series of tubes 44 of such bore that nozzles 19 will enter them readily, and equal in number to the nozzles 19. Tubes 44 are transversely disposed relative to bars 43 with the ends thereof suitably secured in the bars and opening outwardly thereof. The ends of the tubes are preferably swaged outwardly into flared apertures in the side bars as indicated at 46 in Fig. 7, the material of the tubes adjacent the ends thereof being reduced to define shoulders 46 and outwardly flared end portions of the tubes accordingly hold the tubes firmly in the side bars.

Bars 43 are provided with recesses 47 adapted to removably engage guide rods 33 and to permit sliding motion of the mold 42 relative to the guide rods. The mold structure 42 is further provided with handles 48 which may comprise tubes similar to tubes 44 and which are secured to side bars 43 in a similar manner.

The mold structure is adapted to rest between bars 39 and 40 with the side bars 43 in engagement with the rubber strips 41 carried by the bars 39 and 40. The bars 39 and 40, and the mold structure 42 in operation of the apparatus are designed to move in unison toward and from the manifold 10 with tubes 44 telescoping nozzles 19 and consequently the mold structure 42 is detachably secured between the bars 39 and 40 by suitable clamp members 49 each of which is of substantially U-shape having the inner narrow leg 51 thereof rigidly secured to the rear face of the bar 39 and resting between an adjacent pair of nozzles 19, the body portion 52 extending outwardly toward bar 40 under the mold structure 42 and the other or outer comparatively wide leg 53 extending in outwardly spaced relation to the outer face of bar 40 and provided with a recess 54.

Journalled in each recess 53 is an eccentric 55, provided with a suitable manipulating handle 56 upon proper movement of which the eccentric is moved into engagement with the bar 40 and the bars 39 and 40 are accordingly drawn together, tightly binding the mold structure between the rubber strips 41 of the bars 39 and 40. Three such clamps are disclosed but more or less may be employed to clamp the mold structure firmly between bars 39 and 40.

As shown in Fig. 1, in outer position, bar 39 and rubber strip 41 engage the outer ends of nozzles 19 with the rubber strip flush with or extending slightly beyond the ends of the nozzles to permit ready removal of the mold structure 42 upon releasing the clamps, and in outer position bar 40 engages stops 34.

While valve 24 may obviously be actuated by hand and molds may be filled in the apparatus so far described, the present invention comprises means to automatically actuate the valve member 24 by the movement of the mold structure 42. For this purpose an L-shaped rod 57 is provided adjacent each end of the bar 40 having the short leg or extension 58 thereof rigidly secured to bar 40 by any suitable means. The comparatively long legs 59 of the rods 57 extend from the bar 40 inwardly toward the manifold 10 in parallel relation to guide rods 33 and outwardly of and under the rods 33 as is clearly shown in Figures 1 and 2.

Each leg 59 carries at the free end thereof an elongated grooved or slotted head 61 provided with adjustable screw 61' and in the slot of which is slidably mounted a block 62 to which is secured the outer end of a crank 63 by a lost motion pivotal connection as indicated at 64. The opposite end of each crank 63 is provided with a squared aperture to fit the squared ends of the spindles 31 providing a drive connection between the crank and extension. The intermediate portions of long legs 59 are preferably slidably supported within guides 64 which in turn are supported from bar 39 by means of suitable arms 65.

In Figures 3 and 4 a manually operated construction is disclosed in which the automatic valve controlling means is eliminated, and only member 27 is provided to the extension 31 of which a suitable hand actuated handle 66 is secured. Furthermore, in this form of the invention inner bar 39 is eliminated and the mold structure 42 is clamped directly to the bar 40 in engagement with the rubber strip 41 thereof by suitable short clamp members actuated by cam means such as disclosed in Figs. 1 and 2.

The end of the manifold 10 opposite the end in which the member 27 is mounted is closed by means of an externally threaded plug 67 threadedly engaged within the end of the manifold 10 and terminating adjacent the end of the valve member 24. The structures hereinabove described are preferably detachably supported at a suitable distance above the floor with nozzles 19 and tubes 44 extending horizontally by means of a suitable rack 68 as shown in Figures 8 and 9.

The rack comprises two end supports 69 each of which is formed by means of a pair of downwardly diverging members 70 having their lower or farthest spaced ends connected by means of member 71 and suitably connected at the upper or closely spaced ends by suitable means as indicated at 72. The end supports 69 are connected together by suitable intersecting braces 73 at each side of the rack 68 and the end supports 69 are further connected by means of bars 74 which provide a suitable support for pans or other receptacles to catch any excess meat which may fall from the ends of the tubes 44 upon withdrawing the mold structures 42.

In the use of the rack 68 manifold 10 rests upon the member 72 and suitable strap members 75 are engaged about the opposite ends of the manifold 10 and the ends 76 thereof engaged with and secured to the diverging members 70, as is clearly shown.

In the operation of the apparatus hereinbefore described, and as particularly shown in Figures 1 and 2, valve 24 is normally so positioned that apertures 26 will be out of alignment with apertures 14 and opening 25 is out of alignment with the opening of pipe 12 so that no meat can flow from the manifold through the tubes. A supply of empty molds 42 are available and in easy reach of the operator, who when the bars 39 and 40 are in outward position as illustrated in Figures 1 and 2 seizes one of the mold structures from one side of the apparatus and carries it inward between the bars 39 and 40 longitudinally thereof until the slots 47 align with the guide rods 38, whereupon the mold structure is released with the guide rods 38 resting in the slots 47 and the bars 39 and 40 contiguous to the side bars 43 of the mold structure. The operator now actuates the handles 56 to draw the eccentrics 55 into engagement with the bar 40, whereupon the mold structure is tightly clamped between the bars 39 and 40 with the rubber strips 41 engaging the side bars 43 to prevent injury thereto and to provide a cushion connection. The operator now pushes forward on the bar 40 carrying the mold structure 42 inward toward the manifold 10 with the tubes 44 thereof telescoping the nozzles 19 until the outer ends of the nozzles approach the ends of the tubes 44 which have been closed by means of the rubber strip 41 carried by the bar 40. As the bars 39 and 40 move inward toward the manifold 10, the rods 57 move simultaneously therewith, carrying the grooved or slotted heads 61 until the outer ends of the slots or grooves engage the corresponding ends of blocks 62 just before the bars 39 and 40 and mold structure 42 reach their inward limit, thus imparting movement to the arms 63 and rotating cylindrical valve member 24 to completely align the apertures 14 and 26 when the mold structure has reached its extreme inward limit. Sausage meat under pressure which has been introduced into the manifold 10 from the sausage stuffer through pipe 12 and open valve 13 now enters the nozzles 19 through the aligned apertures 14 and 26 and into the outer closed ends of the tubes 44. As the sausage meat continues to enter tubes 44 from the nozzles 19 the mold structure and associated bars 39 and 40 are forced outwardly by the pressure of the meat. During the outward movement of the mold structure the ends of screws 61' engages the adjacent end of block 62 so that when sufficient meat has been injected into the mold to complete the outward movement of the mold until bar 40 engages stops 34, the valve 24 is completely closed with apertures 14 and 26 entirely out of alignment. As the meat fills the molds the air escapes around nozzles 19 through the apertures in bar 39, and bar 39 scrapes the meat off the tubes into the mold. The clamps are now released, permitting bar 39 to move inwardly out of engagement with the mold structure, and the mold is ready for transportation to the cooling or chilling room.

If the pressure of meat is insufficient to force the mold fully outward the operator by a slight pull can aid the outward movement or can retard the outward movement of the mold if the air does not escape rapidly enough to permit a proper filling operation. In this way the molds may be tightly and rapidly filled, little time being required to fill the tubes of each mold structure. Accordingly to facilitate the application the mold structures to and the removal from between the bars 39 and 40 the body portions 52 of the clamps 49 lie below the bars 39 and 40, permitting the mold structures 42 to be expeditiously inserted between and removed from the bars 39 and 40, it being only necessary to manipulate the handles 56 to clamp the mold structures in position and release same after having been filled. Valve 13 permits closing the line between the sausage stuffer and manifold 10 at will to permit or check the flow of meat from the stuffer to the manifold.

In the form of construction shown in Fig. 3 the operator grasps the handle 66 and actuates valve member 24 in accordance with the movement of the mold structure to fill the molds.

It will be seen that a filling structure is provided which is comparatively simple in construction and which is capable of filling the molds effectively and expeditiously and further the structure contributes highly to sanitary conditions due to the ready removability of the valve member 24 and of the series of nozzles 19 which are removable as a unit with the detachable member 17, thus permitting easy and thorough cleaning of all the operating parts.

While I have shown and described certain specific embodiments of my invention it is to be understood that my invention is not limited to the disclosed details but is defined by the terms of the appended claims, accordingly. What I claim as new and desire to secure by United States Letters Patent is:—

1. In combination a manifold provided with a longitudinal series of apertures and a supply inlet; a plurality of nozzles projecting from said manifold in alignment with said apertures; a cylindrical valve member disposed within said manifold and provided with a series of apertures some of which may be brought into registry with said nozzles and another with said supply inlet; and means to impart oscillating movement to said valve member to bring the apertures therein into and out of alignment with said first apertures to control the pressure and flow of meat from said manifold into said nozzles.

2. Apparatus for filling molds comprising a cylindrical manifold; a cylindrical valve member disposed within said manifold; one end of said cylindrical valve member provided with a pair of diametrically opposed slots; a disk member disposed within said manifold contiguous to the corresponding end of said valve member; said member provided with a diametrically extending rib adapted to engage the corresponding slots; a cap member detachably secured to the adjacent end of said manifold in engagement with said disk member; said cap member provided centrally thereof with an aperture; said member provided with an extension protruding through said aperture; and means associated with said extension to impart movement to said valve member.

3. Apparatus for forming sausages comprising a manifold adapted for connection with a sausage stuffer; a valve member within said manifold; nozzles projecting from said manifold; guide rods projecting from said manifold, a bar slidably engaged with said guide rods adapted to have detachably secured thereto a mold structure comprising a plurality of tubes disposed in alignment with said nozzles; said bar adapted to be moved toward said manifold with said tubes telescoping said nozzles to fill said tubes with sausage meat; and means connected with said valve member to actuate same to admit meat to said nozzles when said bar is moved toward said manifold and to check the flow of meat to said nozzles when said bar is moved away from said manifold.

4. Apparatus for forming sausages comprising a manifold adapted for connection with a sausage stuffer; nozzles projecting from said manifold; a valve member within said manifold; guide rods projecting from said manifold; a pair of bars slidably supported by said guide rods; a mold structure disposed between said bars; means for detachably clamping said mold structure between said bars; said mold structure comprising a plurality of tubes in alignment with said nozzles adapted to telescope said nozzles upon movement of said bars toward said manifold; and means operable upon movement of said bars to actuate said valve member to control the flow of sausage meat into said nozzles.

5. Apparatus for forming sausages comprising a cylindrical manifold provided with a longitudinal series of apertures; a plurality of nozzles detachably secured to said manifold with the bores thereof aligned with said apertures; a cylindrical valve member within said manifold provided with a longitudinal series of apertures adapted upon one position of said valve member to align with said first apertures; valve member actuating extensions projecting from the opposite ends of said manifold; a crank secured to each extension; guide rods projecting from said manifold; a pair of bars slidably supported on guide rods; a mold structure detachably clamped between said bars; said mold structure comprising a plurality of tubes the ends of which at one side of the mold structure are closed by one of said bars; the open ends of said tubes adapted to receive said nozzles upon movement of said bars toward said manifold; means supported from said bars adapted upon movement of said bars toward and from said manifold to actuate said cranks to bring said apertures in said valve member into and out of alignment with said first apertures respectively to permit a flow of meat into said nozzles when said nozzles are disposed within said tubes and to check the flow of meat into said nozzles when the mold structure has been fully retracted from said manifold.

6. The structure defined in claim 5 in which each of said crank actuating means comprises an L-shaped rod having the shorter leg thereof rigidly secured to the outer bar; the longer leg of said rod extending toward said manifold parallel to the adjacent guide rod; an elongated head supported by the free end of said longer leg; a slot in said head; a block slidably disposed within said slot; and a lost motion pivotal connection between said block and the free end of said crank.

7. Apparatus for forming sausages comprising a manifold adapted for detachable connection with a sausage stuffer; nozzles projecting from said manifold; guide bars projecting from said manifold; a bar slidably engaged with said guide rods; a mold structure detachably clamped to said bar; and a rack detachably supporting said manifold, nozzles and mold structure with the nozzles projecting horizontally.

8. The structure defined in claim 7 in which said rack comprises a pair of end supports; intersecting braces connecting said end supports; and connections between said end supports disposed parallel to said manifold and adapted to support a receptacle to catch excess sausage meat during operation of said apparatus.

9. Apparatus for forming sausages comprising a manifold; nozzles projecting from said manifold; guide rods projecting from said manifold; a pair of bars slidably supported by said guide rods; a rubber strip carried by each bar; said rubber strips being supported on the opposing faces of said bars; one of said bars and the rubber strip carried thereby being provided with a longitudinal series of apertures to receive said nozzles; a mold structure detachably supported between said bars; said mold structure comprising a pair of side bars and a plurality of open ended tubes secured to said side bars; the open ends of said tubes at one side of said mold structure being closed by the rubber strip of the other of said bars; said bars adapted to be moved toward said manifold with said tubes telescoping said nozzles to introduce meat into said tubes and thereafter withdrawing said bars away from said manifold; and means operable upon oscillating movement of said bars to automatically centralize the flow of meat from said manifold into said nozzles.

10. A sausage molding apparatus comprising a mold structure consisting of a plurality of individual molds each provided with a mold cavity, and means to secure said molds together with their cavities facing in the same direction, a filling structure comprising a manifold, a plurality of nozzles approximating in cross sectional area the cross-sectional area of said cavities, and a unitary control valve for simultaneously but individually controlling the flow of sausage meat from said manifold to said nozzles, said mold and filling structures being arranged and associated so that the nozzles of the filling structure may be entered in the cavities of said mold structure and so that relative motion between said mold and filling structures may take place as the meat is caused to fill the cavities in said mold structure.

11. The combination defined in claim 10 in which said individual molds are normally open at both ends, and in which said filling structure carries means to close one of the open ends of each of said individual molds when the mold structure is assembled with respect to said filling structure, said mold structure being held in position with respect to said filling structure by being clamped detachably against the means that closes one end of each of the individual molds of the mold structure.

12. The combination defined in claim 10 in which said mold structure is provided with spaced stops that include means to vary the spacing of said stops, said stops being arranged to successively contact means carried by said control valve to shift said valve in accordance with the position of said mold structure with respect to the filling structure.

13. Apparatus for filling a sausage mold comprising a mold, a nozzle to relatively snugly fit said mold, means including a resilient member relatively snugly surrounding said nozzle to prevent adherence of meat to said nozzle as it is withdrawn from said mold, means to supply meat to said nozzle so as to cause movement of said nozzle from said mold through said member as the meat flows into and is compacted in said mold, a valve to control the flow of meat to said nozzle and mechanism interconnecting said valve and mold to cause actuation of said valve when the mold is filled by said nozzle.

14. Apparatus for filling a plurality of molds with sausage meat, comprising a plurality of open-ended molds, a corresponding number of nozzles designed to each relatively snugly fill a mold, a pair of bars arranged at opposite ends of said molds, one of said bars closing one end of all of said molds and the other carrying resilient means to relatively snugly fit around the nozzles when the latter are disposed in said molds, and means to supply meat to said nozzles to cause a withdrawal of the nozzles from the molds and to cause said nozzles to move through said resilient means.

15. Apparatus for filling a plurality of molds with sausage meat comprising a plurality of molds, a corresponding number of nozzles each relatively snugly fitting one of said molds, resilient means surrounding said nozzles and attached to said molds for movement as a unit therewith, and means including a manifold to supply meat to said nozzles and to cause separation of the nozzles and molds as the latter are filled and movement of said nozzles through said resilient means.

CHARLES H. VOGT.